United States Patent [19]
Christensen et al.

[11] 3,860,619
[45] Jan. 14, 1975

[54] SULPHONYLUREA DERIVATIVES

[75] Inventors: Haldor Christensen, Tastrup; Behren M. Freidrich Lundt, Sborg; Frederick Christian Gronwald, Vedback; William Andersen, Lyngby, all of Denmark

[73] Assignee: Novo Terapeutisk Laboratorium A/S, Bagsvaerd, Denmark

[22] Filed: Dec. 4, 1972

[21] Appl. No.: 311,973

Related U.S. Application Data
[63] Continuation-in-part of Ser. No. 33,864, May 1, 1970, abandoned.

[30] Foreign Application Priority Data
Aug. 27, 1969 Great Britain .................... 42763/69
Nov. 24, 1969 Great Britain .................... 57434/69

[52] U.S. Cl. ................. 260/346.2 R, 260/346.2 M, 260/473 R, 424/285
[51] Int. Cl. .............................................. C07d 5/40
[58] Field of Search .............. 260/346.2 R, 346.2 M

*Primary Examiner*—G. Thomas Todd
*Attorney, Agent, or Firm*—Synnestvedt & Lechner

[57] ABSTRACT

The invention provides novel compounds of the formula:

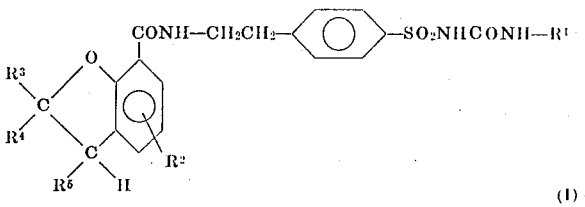

and salts thereof, in which $R^1$ is n-butyl, cycloalkyl having five to eight ring carbon atoms, cyclohexenyl, 4-methylcyclohexyl, 4,4-dimethylcyclohexyl, 4-methoxycyclohexyl, 2,5-endomethylenecyclohexyl or endoethylenecyclohexyl, $R^2$ is hydrogen or methoxy, methyl, bromine or chlorine in position four or in position five, $R^3$ is methyl or hydrogen, $R^4$ and $R^5$ are each hydrogen or methyl but not both methyl at the same time, or $R^4$ and $R^5$ may together form a bond completing a benzo(b)furan ring system.

These compounds are useful in the oral treatment of maturity-onset diabetis mellitus.

14 Claims, No Drawings

SULPHONYLUREA DERIVATIVES

This application is a continuation-in-part of our co-pending application Ser. No. 33,864 filed May 1, 1970 (now abandoned).

The present invention relates to novel sulfonylurea derivatives having the structural formula:

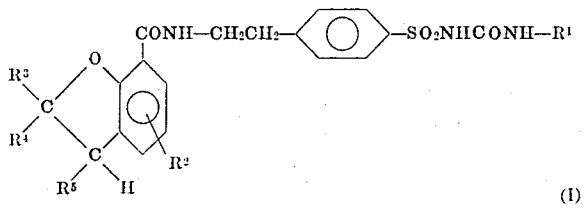

(I)

and salts thereof, in which $R^1$ is n-butyl, cycloalkyl having five to eight ring carbon atoms, cyclohexenyl, 4-methylcyclohexyl, 4,4-dimethylcyclohexyl, 4-methoxycyclohexyl, 2,5-endomethylenecyclohexyl or endoethylenecyclohexyl, $R^2$ is hydrogen or methoxy, methyl, bromine or chlorine in position four or preferably in position five, $R^3$ is methyl or hydrogen, $R^4$ and $R^5$ are each hydrogen or methyl but not both methyl at the same time, or $R^4$ and $R^5$ may together form a bond completing a benzo(b)furan ring system.

Examples of bases which may be used to form physiologically tolerable salts of the benzenesulfonylureas of the formula I are sodium and potassium hydroxide, alkoxides, bicarbonates or carbonates.

The $R^1$-groups of the formula I, as defined above, do not differ from those used in the prior art. The essence, structurally, of the present invention resides entirely in the bicyclic acylamido-groups of the formula:

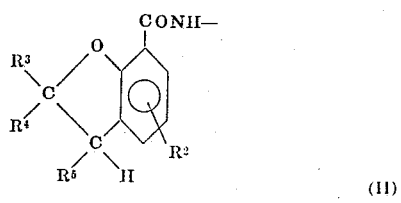

(II)

in which $R^2$, $R^3$, $R^4$ and $R^5$ are as defined above. These bicyclic acylamido-groups are derived from benzo(b)furan-7-carboxylic acids (III) or from 2,3-dihydrobenzo(b)furan-7-carboxylic acids having the following formulas:

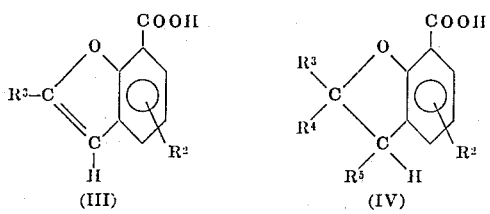

(III)                    (IV)

in which $R^2$ and $R^3$ are as defined above and $R^4$ and $R^5$ each represent hydrogen or methyl but not both methyl at the same time.

The preferred compounds of the invention are those of the formula I in which $R^1$ is a cyclohexyl or a 4-methylcyclohexyl group and in which the acylamido-group of the formula II is selected from the group consisting of:

2-methylbenzo(b)furan-7-carboxamido-
5-methylbenzo(b)furan-7-carboxamido-
5-chloro-2-methylbenzo(b)furan-7-carboxamido-
5-bromo-2-methylbenzo(b)furan-7-carboxamido-
2,5-dimethylbenzo(b)furan-7-carboxamido-
5-methoxybenzo(b)furan-7-carboxamido-
5-methoxy-2-methylbenzo(b)furan-7-carboxamido-
2,3-dihydrobenzo(b)furan-7-carboxamido-
2-methyl-2,3-dihydrobenzo(b)furan-7-carboxamido-
5-methyl-2,3-dihydrobenzo(b)furan-7-carboxamido-
5-bromo-2,3-dihydrobenzo(b)furan-7-carboxamido-
5-chloro-2,3-dihydrobenzo(b)furan-7-carboxamido-
5-chloro-2-methyl-2,3-dihydrobenzo(b)furan-7-carboxamido-
5-bromo-2-methyl-2,3-dihydrobenzo(b)furan-7-carboxamido-
5-methoxy-2-methyl-2,3-dihydrobenzo(b)furan-7-carboxamido-
5-methoxy-2,3-dihydrobenzo(b)furan-7-carboxamido-
2,5-dimethyl-2,3-dihydrobenzo(b)furan-7-carboxamido-
2,3,5-trimethyl-2,3-dihydrobenzo(b)furan-7-carboxamido-
2,2,5-trimethyl-2,3-dihydrobenzo(b)furan-7-carboxamido-and
2,2-dimethyl-5-methoxy-2,3-dihydrobenzo(b)furan-7-carboxamido-.

Especially preferred compounds of the invention are those of the formula I in which $R^1$ is a cyclohexyl or a 4-methylcyclohexyl group, $R^2$ is 5-methoxy, 5-methyl, 5-bromo, 5-chloro or hydrogen, $R^3$ is hydrogen or methyl and $R^4$ as well as $R^5$ are hydrogen.

The following compounds are considered to be particularly valuable:

N-(4-(2-(2,3-dihydrobenzo(b)furan-7-carboxamido)-ethyl)-benzenesulfonyl)-N'-cyclohexylurea,
N-(4-(2-(5-methoxy-2-methyl-2,3-dihydrobenzo(b)furan-7-carboxamido)-ethyl)-benzenesulfonyl)-N'-cyclohexylurea, and N-(4-(2-(5-methoxy-2-methyl-2,3-dihydrobenzo(b)furan-7-carboxamido)-ethyl)-benzenesulfonyl)-N'-(trans-4-methylcyclohexyl)-urea.

Only a few carboxylic acids are known which fulfill the structural requirements of this invention as set forth in formula III and in formula IV and thus may be used to synthesize sulfonylurea derivatives of the formula I. The following carboxylic acids have been reported earlier:

2-methyl-2,3-dihydrobenzo(b)furan-7-carboxylic acid (U.S. Pat. No. 2,937,188),
4-methoxy-2-methyl-2,3-dihydrobenzo(b)furan-7-carboxylic acid (J. Am. Chem. Soc. 64, 2986 (1942)),
5-methyl-2,3-dihydrobenzo(b)furan-7-carboxylic acid (Bull. Soc. Chim. France (5), 1957, 835),
Benzo(b)furan-7-carboxylic acid (Ann. Chim. (Rome) 53, 1582 (1963)) and
2-methylbenzo(b)furan-7-carboxylic acid (J. Am. Chem. Soc. 41, 664 (1919)).

A number of novel benzo(b)furan-7-carboxylic acids of the formula III as well as a number of novel 2,3-dihydrobenzo(b)furan-7-carboxylic acids of the formula IV have been prepared and used as starting materials in the synthesis of novel sulfonylurea derivatives of the formula I.

Benzo(b)furan-7-carboxylic acids of the formula III in which $R^3$ is methyl are prepared from $R^2$-substituted salicylic esters by the following processes:

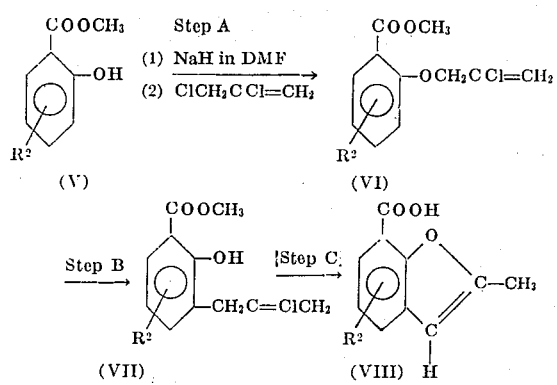

Step A is a conventional and well established ether synthesis. Step B is the highly exothermic Claisen-rearrangement which is preferably performed at 200°–220°C using N-methyl-2-pyrrolidone as solvent, and Step C is the combined ring closure and saponification step which is preferably performed with potassium hydroxide in 2-methoxyethanol. The 2-methylbenzo(b)furan-7-carboxylic acids (VIII) thus prepared — except those in which $R^2$ is chlorine or bromine — may be converted to the corresponding 2-methyl-2,3-dihydrobenzo(b)furan-7-carboxylic acids (IX) through low pressure hydrogenation of solutions of their sodium salts at a pH of approximately 6.5 and at 50°C to 70°C using palladium on carbon as a catalyst:

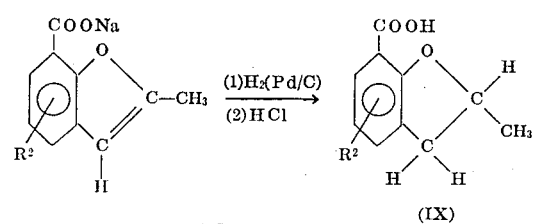

2-methyl-2,3-dihydrobenzo(b)furan-7-carboxylic acids of the formula IX in which $R^2$ is bromine or chlorine (as well as methyl, methoxy or hydrogen) are prepared from the corresponding salicylic esters by the following processes:

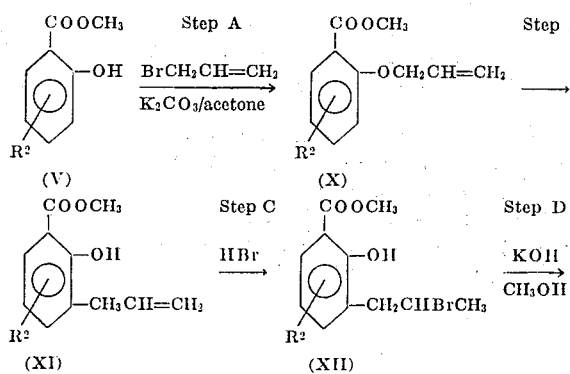

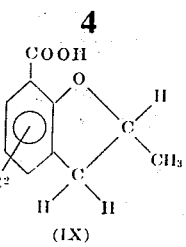

These processes are conducted essentially as described earlier by Arnold and Moran (J. Am. Chem. Soc. 64, 2986 (1942)) for the preparation of 4-methoxy-2-methyl-2,3-dihydrobenzo(b)-furan-7-carboxylic acid except for our improved method of performing the Claisen rearrangement as described above and our improvements in the ring closure and saponification step. These improvements are easily recognized by those skilled in the art when the detailed procedures given below are compared with those described in the literature cited. When crotyl bromide is used instead of the allyl bromide there is similarly obtained 2,3-dimethyl-2,3-dihydrobenzo(b)furan-7-carboxylic acids (XIII):

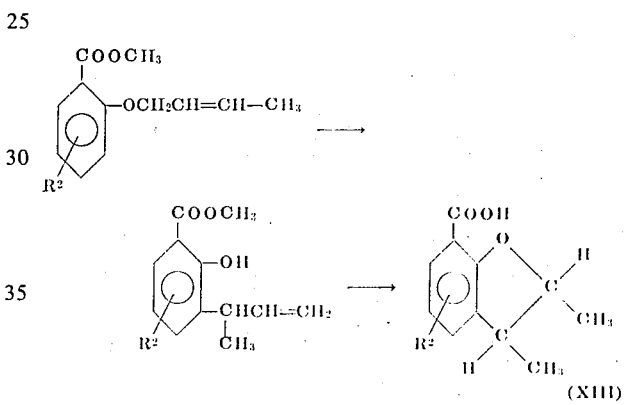

Similarly there may be used β-methallyl chloride instead of the allyl bromide, but the ring closure of the hydrogen bromide adduct according to the scheme described above is not feasible with this type of compounds since dehydrobromination results when the hydrogen bromide adduct is treated with potassium hydroxide in methanol. Instead the cyclization is performed by refluxing with 90% formic acid for two hours:

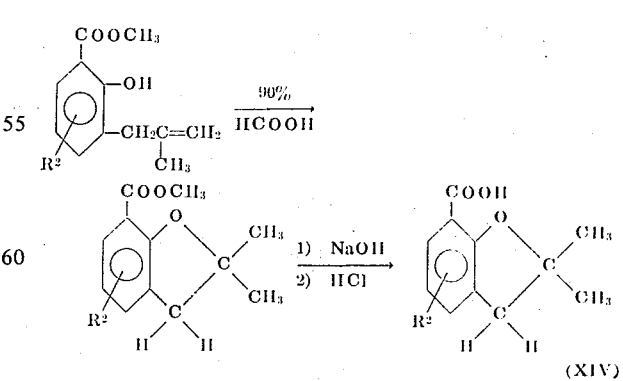

Benzo(b)furan-7-carboxylic acids of the formula III in which $R^3$ is hydrogen and $R^2$ is methyl or methoxy (XVI) are prepared through carbonation of the corresponding Grignard-reagents:

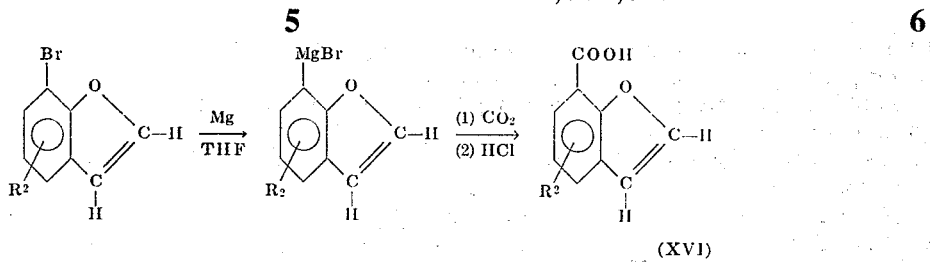

(XVI)

The 7-bromo-benzo(b)furans (XV) used as starting materials in this scheme are prepared as published by Kurdukar and Rao (Indian Acad. Sci. LVIII, 336 (1963)). The benzo(b)-furan-7-carboxylic acids of the formula XVI in which $R^2$ is methyl or methoxy may be converted to the corresponding 2,3-dihydrobenzo(b)furan-7-carboxylic acids XVII by catalytic hydrogenation as described above:

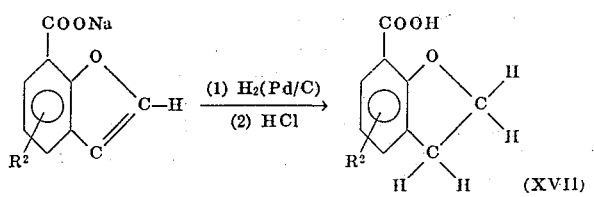

(XVII)

The unsubstituted 2,3-dihydrobenzo(b)furan-7-carboxylic acid XVIII is most conveniently prepared through ortho-lithiation of 2,3-dihydrobenzo(b)furan with the 1:1 molar complex of n-butyllithium with N,N-,N',N'-tetramethylethylenediamine (TMEDA) in hexane followed by carbonation and acidification:

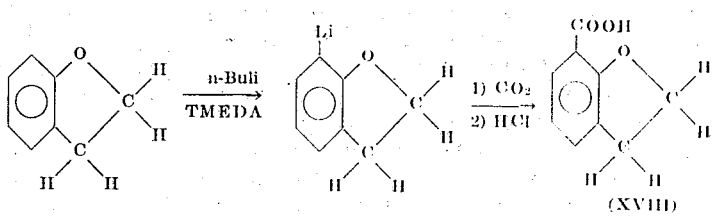

(XVIII)

Bromination or chlorination of this compound at room temperature in acetic acid leads to the corresponding 5-bromo- and 5-chloro-2,3-dihydrobenzo(b)furan-7-carboxylic acids.

The novel sulfonylurea derivatives of the formula I may be prepared by a variety of procedures already known per se in the prior art. The preferred method of preparation may be illustrated as follows:

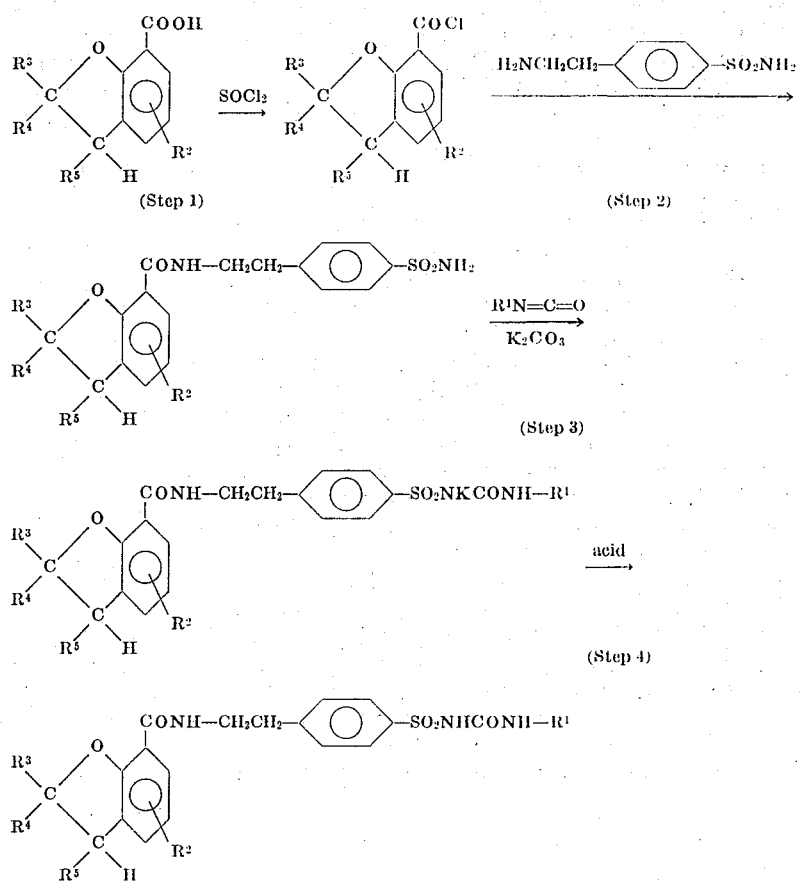

Step 1 is a conventional conversion of the carboxylic acid in question to the corresponding acid chloride. This is conveniently performed by treating the carboxylic acid with thionyl chloride using a trace of dimethylformamide as a catalyst. This reaction may be performed in a large excess of thionyl chloride or preferably in an inert hydrocarbon solvent as for example isooctane using about 1.5 moles of thionyl chloride per mole of carboxylic acid. Most of the acid chlorides of this invention are solids which are easily isolated by filtration. The excess thionyl chloride and the hydrocarbon solvent may also be removed by vacuum stripping after the reaction thus leaving a crude acid chloride which may be used in Step 2 without further purification. This method of work-up is particularly useful in those cases where the acid chlorides are liquids.

Step 2 is an acylation process which may be carried out in the conventional manner using pyridine as solvent and acid binding agent. Especially preferred, however, is an acylation scheme in which a solution of the acid chloride in dioxane is added to a solution of 4-(2-aminoethyl)-benzenesulfonamide hydrochloride (J. Am. Chem. Soc. 62, 2099 (1940)) in dioxane-water at a lower temperature — preferably at 5°C to 10°C — while the pH is maintained at approximately 9.8 by simultaneous addition of sodium hydroxide solution. After this reaction the pH is lowered by addition of acid and the 4-(2-acylamidoethyl)-benzenesulfonamide is recovered by filtration and is purified by recrystallization from a suitable solvent system.

Step 3 consists in a conversion of the sulfonamide prepared in Step 2 to a salt of the desired sulfonylurea derivative through reaction with the appropriate $R^1$-substituted isocyanate in the presence of a base. This reaction is preferably performed in dry acetone using anhydrous potassium carbonate as the base. The potassium salts of the desired sulfonylurea derivatives are — with a few exceptions — insoluble in anhydrous acetone and are thus recovered by filtration.

Step 4 is a conversion of the salts of the sulfonylurea derivatives, usually the potassium salts, as prepared in Step 3 to the free sulfonylurea derivatives. The salts from Step 3 are dissolved in water or in water containing some acetone and the pH is lowered to approximately 9.2. Small amounts of unreacted sulfonamide and small amounts of a urea derivative of the formula $R^1NHCONHR^1$ may then be removed by filtration and the filtrate is acidified. The desired sulfonylurea derivative is finally recovered by filtration.

A further step may be added if desired by conversion of the sulfonylurea derivatives obtained in Step 4 to their salts preferably the sodium salts or the potassium salts. Such salts may be used in pharmaceutical preparations of the compounds or they may be used as a means of further purification of the sulfonylurea derivatives. The formation of these salts is a simple operation in which the sulfonylurea derivative in question is treated with slight excess of a base as for example sodium methylate or potassium hydroxide in a polar solvent as for example methanol after which it is usually advantageous to add a solvent in which the desired salt is only sparingly soluble as for example diethyl ether or acetone. The desired salt of the sulfonylurea derivative is then recovered by filtration.

When the compounds of the present invention are employed as therapeutic agents they may be administered alone or in combination with pharmaceutically acceptable excipients, the proportion of which is determined by the solubility and chemical nature of the compound, chosen method of administration and standard pharmaceutical practice. For example, they may be administered orally in the form of tablets, capsules or pellets containing such excipients as lactose, glucose, saccharose, mannitol, sorbitol, starches derived from wheat, corn, rice and potato, microcrystalline cellulose and other cellulose derivatives, acacia, tragacanth, gelatine, alginates, polyethylene glycols, polyvinylpyrrolidone, magnesium aluminum silicate, talc, metallic stearates, stearic acid, silicium dioxide and surfactants. The tablets or pellets may furthermore be coated with a membrane of cellulose derivatives, methacrylates, waxes, fatty acids and cellulose acetate phthalate to achieve a sustained release of the active ingredient. Thus anyone of the benzenesulphonylurea compounds of the invention may be mixed with the excipients in question or it may be distributed upon these as a solution followed by evaporation of the solvent. A glidant as for example talc and a lubricant as for example magnesium stearate may then be added and the mixture is finally compressed into tablets or filled into hard gelatine capsules. It is also possible at the stage before the addition of the glidant and the lubricant to granulate the mixture by using — as an example — a solution of polyvinylpyrrolidone in water of in alcohols and other organic solvents. The wet granules may then be shaped into pellets in equipment well established for this purpose or they may be dried directly and used to make tablets or to fill into capsules as mentioned above. The tablets or the pellets may be coated in a coating pan or in a fluidized bed apparatus with a thin diffusion membrane — as for example a membrane of ethylcellulose — to obtain a sustained release of the active ingredient.

The dosage of the present therapeutic agents will vary with the method of administration and the particular compound chosen. Furthermore, it will vary with the subject under treatment. In general, the compounds of this invention are most desirably administered at a dosage level that will afford effective results and preferably at a dosage level that is in the range of from 1 mg to about 25 mg per day, although, in individual cases, division as well as multiplication of doses may be necessary.

The novel sulfonylurea derivatives of the formula I exert a strong blood-sugar lowering activity after oral administration and are thus useful for the preparation of pharmaceutical compositions for oral treatment of maturity-onset *diabetis mellitus*.

The strong blood-sugar lowering activity of the novel compounds of the formula I has been demonstrated by feeding solutions of their sodium salts to fasted rabbits and measuring their blood-sugar concentration over a prolonged period of time by the modified method of W. S. Hoffmann (J. Biol. Chem. 120, 51 (1937)) using a Technicon Autoanalyzer. The blood-sugar lowering activity of a number of the novel sulfonylurea derivatives described below is shown in Table I.

The blood-sugar lowering activity of the following three compounds of the prior art is given in Table II for comparison:

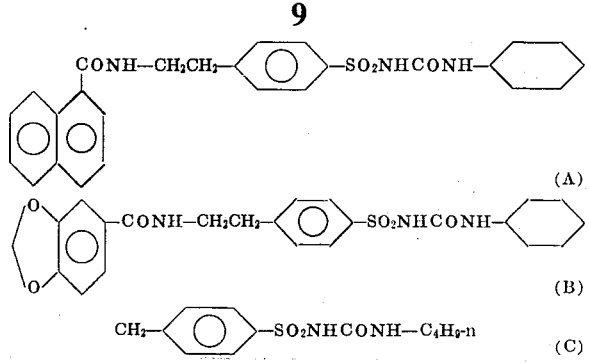

Compound A is described in Danish Pat. No. 118,553 (Example 1) along with a number of sulfonyl-urea derivatives of a similar structure all of which contain acylamido-groups derived from bicyclic ring systems containing carbon atoms only in the rings.

Compound B is described in Danish Pat. No. 119,052 (Example 53) and represents the very few known compounds containing an acylamido-group derived from a bicyclic ring system containing two oxygen atoms in the ring.

Compound C is tolbutamide which is the oral antidiabetic compound used most widely so far.

TABLE 1

Blood-sugar lowering activity as % decrease of initial blood-sugar concentration in rabbits after oral administration of a single dose following sixteen hours of fasting.

A dash (-) in the table below indicates a blood-sugar lowering measured to be less than 10%.

| No. | Compound | Dose mg/kg | Lowering of Blood-Sugar Concentration after: | | | |
|---|---|---|---|---|---|---|
| | | | 4 hrs. | 6 hrs. | 8 hrs. | 24 hrs. |
| 1: | N-(4-(2-(5-methoxy-2-methyl-2,3-dihydrobenzo(b)furan-7-carboxamido)-ethyl)-benzenesulfonyl)-N'-cyclohexylurea | 0.2 0.02 | 32% 13% | 35% 14% | 32% 14% | 13% — |
| 2: | N-(4-(2-(2,3-dihydrobenzo(b)furan-7-carboxamido)-ethyl)-benzenesulfonyl)-N'-cyclohexylurea | 0.2 0.05 0.02 | 32% 16% — | 38% 20% 10% | 37% 20% 11% | 15% — — |
| 3: | N-(4-(2-(5-methoxy-2-methyl-2,3-dihydrobenzo(b)furan-7-carboxamido)ethyl))-benzenesulfonyl)-N'-(trans-4-methylcyclohexyl)-urea | 0.2 0.05 0.02 | 18% 16% 10% | 25% 18% 14% | 30% 18% 13% | 18% — — |
| 4: | N-(4-(2-(2,5-dimethyl-2,3-dihydrobenzo(b)furan-7-carboxamido)-ethyl)-benzenesulfonyl)-N'-cyclohexylurea | 0.2 0.05 0.02 | 35% 20% 14% | 35% 22% 17% | 39% 21% 17% | 21% — — |
| 5: | N-(4-(2-(2-methyl-2,3-dihydrobenzo(b)furan-7-carboxamido)-ethyl)-benzenesulfonyl)-N'-cyclohexylurea | 0.2 0.05 | 31% 14% | 32% 10% | 29% — | — — |
| 6: | N-(4-(2-(5-methyl-2,3-dihydrobenzo(b)furan-7-carboxamido)-ethyl)-benzenesulfonyl)-N'-cyclohexylurea | 0.2 0.05 0.02 0.01 0.005 | 35% 30% 19% 13% — | 39% 33% 26% 20% 13% | 44% 35% 29% 20% 17% | 22% — — — — |
| 7: | N-(4-(2-(2,3-dihydrobenzo(b)furan-7-carboxamido)-ethyl)-benzenesulfonyl)-N'-(trans-4-methylcyclohexyl)-urea | 0.2 0.05 | 38% 21% | 44% 22% | 40% 28% | 36% 11% |
| 8: | N-(4-(2-(5-chloro-2-methylbenzo(b)furan-7-carboxamido)-ethyl)-benzenesulfonyl)-N'-cyclohexylurea | 0.2 0.05 0.02 | 28% 29% 14% | 33% 31% 18% | 34% 30% 19% | 28% — — |
| 9: | N-(4-(2-(2,5-dimethyl-2,3-dihydrobenzo(b)furan-7-carboxamido)-ethyl)-benzenesulfonyl)-N'-n-butylurea | 0.2 | 28% | 23% | 29% | 10% |
| 10: | N-(4-(2-(2,5-dimethyl-2,3-dihydrobenzo(b)furan-7-carboxamido)-ethyl-benzenesulfonyl)-N'-(4-methoxycyclohexyl)-urea | 0.2 0.05 | 33% 16% | 37% 21% | 35% 19% | 23% — |
| 11: | N-(4-(2-(2,5-dimethyl-2,3-dihydrobenzo(b)furan-7-carboxamido)-ethyl)-benzenesulfonyl)-N'-(2,5-endomethylenecyclohexyl)-urea | 0.2 | 32% | 32% | 24% | — |
| 12: | N-(4-(2-(2,5-dimethyl-2,3-dihydrobenzo(b)furan-7-carboxamido)-ethyl)-benzenesulfonyl)-N'-(1,4-endoethylenecyclohexyl)-urea | 0.2 0.05 | 29% 14% | 36% 18% | 35% 17 | 11% — |
| 13: | N-(4-(2-(2,5-dimethyl-2,3-dihydrobenzo(b)furan-7-carboxamido)-ethyl)-benzenesulfonyl)-N'-(2-cyclohexenyl)-urea | 0.2 0.05 | 31% 18% | 31% 14% | 29% 11% | 13% — |
| 14: | N-(4-(2-(2,5-dimethyl-2,3-dihydrobenzo(b)furan-7-carboxamido)-)-ethyl)-benzenesulfonyl)-N'-cyclopentylurea | 0.2 | 21% | 19% | 15% | — |

| No. | Compound | Dose mg/kg | Lowering of Blood-Sugar Concentration after: | | | |
|---|---|---|---|---|---|---|
| | | | 4 hrs. | 6 hrs. | 8 hrs. | 24 hrs. |
| 15: | N-(4-(2-(5-methoxy-2-methyl-2,3-dihydrobenzo(b)furan-7-carboxamido)-ethyl)-benzenesulfonyl)-N'-cycloheptylurea | 0.2<br>0.05 | 27%<br>12% | 22%<br>10% | 13%<br>11% | —<br>— |
| 16: | N-(4-(2-(5-methoxy-2-methyl-2,3-dihydrobenzo(b)furan-7-carboxamido)-ethyl)-benzenesulfonyl)-N'-(4,4-dimethylcyclohexyl)-urea | 0.2 | 23% | 22% | 31% | 15% |
| 17: | N-(4-(2-(2-methyl-2,3-dihydrobenzo(b)furan-7-carboxamido)-ethyl)-benzenesulfonyl)-N'-cyclooctylurea | 0.2 | 14% | 11% | 10% | — |
| 18: | N-(4-(2-(4-methoxy-2-methyl-2,3-dihydrobenzo(b)furan-7-carboxamido)-ethyl)-benzenesulfonyl)-N'-(4-methylcyclohexyl)-urea | 0.2<br>0.05 | 27%<br>17% | 34%<br>15% | 31%<br>14% | —<br>— |
| 19: | N-(4-(2-(2,2,5-trimethyl-2,3-dihydrobenzo(b)furan-7-carboxamido)-ethyl)-benzenesulfonyl)-N'-cyclohexylurea | 0.2 | 22% | 15% | 10% | — |
| 20: | N-(4-(2-(2,3,5-trimethyl-2,3-dihydrobenzo(b)furan-7-carboxamido)-ethyl)-benzenesulfonyl)-N'-cyclohexylurea | 0.2 | 25% | 19% | 14% | — |
| 21: | N-(4-(2-(5-bromo-2-methyl-2,3-dihydrobenzo(b)furan-7-carboxamido)-ethyl)-benzenesulfonyl)-N'-cyclohexylurea | 0.2<br>0.05 | 29%<br>20% | 30%<br>22% | 32%<br>20% | 12%<br>— |
| 22: | N-(4-(2-(2,5-dimethylbenzo(b)furan-7-carboxamido)-ethyl)-benzenesulfonyl)-N'-cyclohexylurea | 0.2<br>0.05 | 37%<br>23% | 47%<br>22% | 40%<br>23% | 14%<br>10% |
| 23: | N-(4-(2-(5-methylbenzo(b)furan-7-carboxamido)-ethyl)-benzenesulfonyl)-N'-cyclohexylurea | 0.2<br>0.05<br>0.02<br>0.01 | 28%<br>23%<br>11%<br>— | 30%<br>24%<br>18%<br>11% | 33%<br>33%<br>18%<br>11% | 43%<br>21%<br>11%<br>— |

TABLE II

Blood-sugar lowering activity of known benzenesulfonylurea derivatives when tested in the exactly same manner as the compounds of Table I

| | Compound | Dose mg/kg | Lowering of Blood-Sugar Concentration after | | | |
|---|---|---|---|---|---|---|
| | | | 4 hrs. | 6 hrs. | 8 hrs. | 24 hrs. |
| A: | N-(4-(2-(naphthalene-1-carboxamido)-ethyl)-benzenesulfonyl)-N'-cyclohexylurea | 2.0<br>1.0<br>0.75<br>0.3 | 29%<br>21%<br>14%<br>— | 34%<br>29%<br>23%<br>14% | 33%<br>25%<br>21%<br>13% | —<br>—<br>—<br>— |
| B: | N-(4-(2-(3,4-methylenedioxybenzamido)-ethyl)-benzenesulfonyl)-N'-cyclohexylurea | 1.0<br>0.5<br>0.2 | 35%<br>31%<br>12% | 40%<br>36%<br>19% | 34%<br>31%<br>15% | 11%<br>—<br>— |
| C: | N-(4-methylbenzenesulfonyl)-N'-n-butylurea (Tolbutamide) | 40<br>30<br>20<br>10 | 29%<br>25%<br>20%<br>14% | 33%<br>24%<br>18%<br>13% | 33%<br>19%<br>18%<br>— | —<br>—<br>—<br>— |

The novel benzenesulfonylurea derivatives of the invention are furthermore distinguished by a very low acute toxicity. As an example, mention could be made of compound No. 5 (Table I) for which $LD_{50} > 20000$ mg/kg after oral administration of a suspension of micronized material to rats and mice, whereas $LD_{50}$ was found to be 12500 mg/kg upon interperitoneal administration to the same species. Tolbutamide showed $LD_{50}$ = 1,500 mg/kg p.o. and $LD_{50}$ = 800 mg/kg i.p. in mice as well as $LD_{50}$ = 2,700 mg/kg p.o. and $LD_{50}$ = 1,200 mg/kg i.p. in rats when tested in the same manner.

A better understanding of the invention will be gained from the following non-limitative examples which are for the purpose of illustrating the various features thereof.

EXAMPLE 1

N-(4-(2-(5-methoxy-2-methyl-2,3-dihydrobenzo(b)furan-7-carboxamido)-ethyl)-benzenesulfonyl)-N'-cyclohexylurea A. 5-methoxy-2-methyl-2,3-dihydrobenzo(b)furan-7-carboxylic acid a. Methyl 2-β-chloroallyloxy-5-methoxybenzoate 218 g of methyl-5-methoxysalicylate is added slowly at 60°C to a slurry of 32 g of sodium hydride in 360 ml of dimethylformamide. Stirring is continued until the evolution of hydrogen ceases and the solution is then heated to 95°C. 146 g of 2,3-dichloro-1-propene is then added during 30 minutes and the mixture is stirred at 100°C to 105°C for 3 hours. After cooling to room temperature 20 ml of methanol is added cautiously and the solution is then poured into a mixture of 800 g of crushed ice, 600 ml of 5% sodium hydroxide solution and 1,600 ml of toluene. The aqueous phase is separated and then reextracted with 400 ml of toluene. The combined toluene layers are washed with a saturated solution of sodium chloride and the toluene is then stripped off in vacuum. There remains 285 g (92.6%) of almost pure methyl-2-β-chloroallyloxy-5-methoxybenzoate.

b. Methyl-3-β-chloroallyl-5-methoxysalicylate 285 g of 2-β-chloroallyloxy-5-methoxybenzoate from above is mixed with 285 ml of N-methyl-2-pyrrolidone and is then stirred under a nitrogen atmosphere at 200°C for 6 hours. The solution is cooled to room temperature and is then poured into a mixture of 570 g of crushed ice, 17 ml of 37% hydrochloric acid, 228 g of sodium chloride, 630 ml of water and 570 ml of toluene. The aqueous phase is separated and is re-extracted with 230 ml of toluene. The toluene layers are combined and the toluene is stripped off in vacuum. The residue is dissolved in 140 ml of acetone and 14 g of activated carbon is added. 1400 ml of isooctane is then added slowly with stirring after which the solids are filtered off. The solvents are removed from the filtrate by vacuum stripping to yield 262 g (92%) of almost pure methyl-3-β-chloroallyl-5-methoxysalicylate which crystallizes upon standing (the pure material has M.P. 46°–47°C).

c. 5-methoxy-2-methylbenzo(b)furan-7-carboxylic acid 247 g of 3-β-chloroallyl-5-methoxysalicylate from above is added during 10 minutes to a solution (35°C) of 162 g of potassium hydroxide in 890 of 2-methoxyethanol. The mixture is heated to 116°C and stirred with reflux for 2 hours after which it is cooled to 25°C. 1800 ml of water is then added and the resulting solution is poured slowly into a mixture of 290 ml of 37% hydrochloric acid and 1,800 g of crushed ice. The crystals are filtered off and washed thoroughly with water. After drying there is obtained 173 g (87%) of crude 5-methoxy-2-methylbenzo(b)furan-7-carboxylic acid, M.P. 163-168°C. This material is dissolved in a solution of 37 g of sodium hydroxide in 645 ml of water. 210 g of sodium chloride is then added slowly. The sodium salt is filtered off and washed with a saturated sodium chloride solution. The moist cake is redissolved in 2,100 ml of water and the solution is treated with 17 g of activated charcoal and 17 g of Hyflo. The solids are filtered off and the colorless filtrate is added to a mixture of 130 ml of 37% hydrochloric acid and 1,600 g of crushed ice. The crystals are filtered off and washed with water. After drying there is obtained 138 g (80% recovery) of pure 5-methoxy-2-methylbenzo(b)furan-7-carboxylic acid, M.P. 171°–172°C.

d. 5-methoxy-2-methyl-2,3-dihydrobenzo(b)furan-7-carboxylic acid 138 g of purified 5-methoxy-2-methylbenzo(b)furan-7-carboxylic acid is dissolved in a solution of 28 g of sodium hydroxide in 690 ml of water. The pH is then adjusted to 6.5 and 6.9 g of 5% palladium on charcoal is added. The hydrogenation is performed at 70°C and under a hydrogen pressure of 45 psig. The catalyst is then filtered off and the filtrate is acidified. The crystals are recovered by suction and dried. The yield of pure 5-methoxy-2-methyl-2,3-dihydrobenzo(b)furan-7-carboxylic acid, M.P. 123°–124°C, is 123 g (89%).

B. 5-methoxy-2-methyl-2,3-dihydrobenzo(b)furan-7-carbonyl chloride 79.4 g of 5-methoxy-2-methyl-2,3-dihydrobenzo(b)furan-7-carboxylic acid from above is stirred in a mixture of 575 ml of isooctane and 0.5 g of dimethylformamide. 72.5 g of thionyl chloride is added dropwise and the slurry is then heated slowly to 50°C at which temperature it is stirred for 30 minutes. The slurry is then cooled to 0°C and the crystals are filtered off, washed with cold isooctane and dried in vacuum. The yield of 5-methoxy-2-methyl-2,3-dihydrobenzo(b)furan-7-carbonyl chloride, M.P. 77°–79°C, is 84.5 g (98%).

C. 4-(2-(5-methoxy-2-methyl-2,3-dihydrobenzo(b)furan-7-carboxamido)-ethyl)benzenesulfonamide 144 g of 4-(2-aminoethyl)-benzenesulfonamide is dissolved in a mixture of 200 ml of dioxane, 1,080 ml of water and 64 ml of 37% hydrochloric acid. The solution is cooled to 5°C and its pH is adjusted to 9.8 after which a solution of 163 g of 5-methoxy-2-methyl-2,3-dihydrobenzo(b)furan-7-carbonyl chloride in 880 ml of dioxane is added dropwise at 5°C to 10°C while the pH is maintained at 9.8 by simultaneous addition of 8 N sodium hydroxide solution. Stirring is continued at these conditions for additional 2 hours after the addition and the pH is then lowered to approximately 3. The crystals are filtered off and washed with water. 258 g (92%) of crude material, M.P. 195°–199°C, is obtained after drying. Recrystallization from dioxane-water yields 232 g (90% recovery) of pure 4-(2-(5-methoxy-2-methyl-2,3-dihydrobenzo(b)furan-7-carboxamido)-ethyl)-benzenesulfonamide, M.P. 202°–204°C.

D. N-(4-(2-(5-methoxy-2-methyl-2,3-dihydrobenzo(b)furan-7-carboxamido)-ethyl)-benzenesulfonyl)-N'-cyclohexylurea A mixture of 207 g of 4-(2-(5-methoxy-2-methyl-2,3-dihydrobenzo(b)furan-7-carboxamido)-ethyl)-benzenesulfonamide, 163 g of finely divided anhydrous potassium carbonate and 80 g of cyclohexylisocyanate in 4.2 liters of dry acetone is stirred and refluxed overnight (approximately 16 hours) and then cooled to room temperature. The suspended solids (consisting mainly of the potassium salt of the N-(4-(2-(5-methoxy-2-methyl-2,3-dihydrobenzo-(b)furan-7-carboxamido)-ethyl)-benzenesulfonly)-N'-cyclohexylurea) are filtered off and washed thoroughly with dry acetone. The wet cake is then dissolved in a mixture of 10.6 liters of distilled water and 2.65 liters of acetone. The pH of this solution is adjusted to 9.2 and the solution is then stirred for two hours. A small amount of insoluble material is then removed by filtration and the filtrate is added slowly with stirring to a mixture of 150 ml of 37% hydrochloric acid and 17.7 liters of distilled water. The crystals are filtered off and washed thoroughly with distilled water. After drying in vacuum at approximately 40°C there is obtained 260 g (95%) of N-(4-(2-(5-methoxy-2-methyl-2,3-dihydrobenzo(b)furan-7-carboxamido)-ethyl)-benzenesulfonyl)-N'-cyclohexylurea, M.P. 161°–162°C.

EXAMPLE 2

N-(4-(2-(2,3-dihydrobenzo(b)furan-7-carboxamido)-ethyl)-benzenesulfonyl)-N'-cyclohexylurea.

A. 2,3-dihydrobenzo(b)furan-7-carboxylic acid 60 g (0.5 mole) of 2,3-dihydrobenzo(b)furan is added to a solution of 0.7 mole of the 1:1 molar complex of n-butyllithium and N,N,N',N'-tetramethylethylenediamine in 700 ml of hexane. The mixture is stirred at 25°C for 16 hours and is then forced into a vessel in which dry toluene is stirred vigorously under carbon dioxide at a pressure slightly above that of the atmosphere. 1000 ml of water is then added to dissolve the salts. The aqueous phase is separated and mixed with 20 g of Hyflo and 10 g of activated carbon. The pH is lowered to 6.5 by addition of dilute hydrochloric acid and the solids are then removed by filtration. The filtrate is concentrated in vacuum to approximately 300 ml and the crystals are filtered off and then washed with a saturated solution of sodium chloride. The moist cake is dissolved in 900 ml of water and acidified by addition of hydrochloric acid. The crystals are filtered off and washed with water. After drying there is obtained 44.4 g (54%) of pure 2,3-dihydrobenzo(b)furan-7-carboxylic acid, M.P. 169°–170°C.

B. 2,3-dihydrobenzo(b)furan-7-carbonyl chloride, M.P. 54°–56°C, is prepared from 2,3-dihydrobenzo(b)furan-7-carboxylic acid by the procedure used in Example 1,B. The yield is 97%.

C. 4-(2-(2,3-dihydrobenzo(b)furan-7-carboxamido)-ethyl)-benzenesulfonamide, M.P. 204°–205°C (dioxane-water), is prepared from 2,3-dihydrobenzo(b)furan-7-carbonyl chloride and 4-(2-aminoethyl)-benzenesulfonamide by a process similar to the one used in Example 1,C.

D. N-(4-(2-(2,3-dihydrobenzo(b)furan-7-carboxamido)-ethyl)-benzenesulfonyl)-N'-cyclohexylurea, M.P. 157°–158°C or M.P. 183°–184°C, is prepared in an 89% yield from 4-(2-(2,3-dihydrobenzo(b)furan-7-carboxamido)-ethyl)-benzenesulfonamide and cyclohexylisocyanate by proceeding as described in Example 1,D.

EXAMPLE 3

N-(4-(2-(5-methoxy-2-methyl-2,3-dihydrobenzo(b)furan-7-carboxamido)-ethyl)-benzenesulfonyl)-N'-(trans-4-methylcyclohexyl)-urea Proceeding as in Example 1,D, except using 89 g of trans-4-methylcyclohexylisocyanate instead of the 80 g of cyclohexylisocyanate there is obtained 259 g (92%) of N-(4-(2-(5-methoxy-2-methyl-2,3-dihydrobenzo(b)furan-7-carboxamido)-ethyl)-benzenesulfonyl)-N'-(trans-4-methylcyclohexyl)-urea, M.P. 167°–168°C. A monohydrate of this compound melts at 122°–124°C.

EXAMPLE 4

Potassium salt of N-(4-(2-(2,3-dihydrobenzo(b)furan-7-carboxamido)-ethyl)-benzenesulfonyl)-N'-cyclohexylurea 4.7 g of N-(4-(2-(2,3-dihydrobenzo(b)furan-7-carboxamido)-ethyl)-benzenesulfonyl)-N'-cyclohexylurea is added with stirring to a solution of 0.59 g of potassium hydroxide in 15 ml of methanol. A clear solution is formed and the potassium salt starts crystallizing after a short while. 75 ml of diethyl ether is then added slowly after which the crystals are filtered off and washed with diethyl ether. The potassium salt of N-(4-(2-(2,3-dihydrobenzo(b)-furan-7-carboxamido)-ethyl)-benzenesulfonyl)-N'-cyclohexylurea, M.P. 247°–249°C, is obtained in a yield of 4.4 g (86%).

EXAMPLE 5

Sodium salt of N-(4-(2-(2,5-dimethyl-2,3-dihydrobenzo(b)furan-7-carboxamido)-ethyl)-benzenesulfonyl)-N'-cyclohexylurea A. 2,5-dimethyl-2,3-dihydrobenzo(b)furan-7-carboxylic acid a. Methyl-2-allyloxy-5-methylbenzoate 429 g of methyl-5-methylsalicylate, 356 g of anhydrous potassium carbonate, 312 g of allyl bromide and 430 ml of acetone are stirred and refluxed for 24 hours. 400 ml of acetone is then distilled off and the residue is cooled to 25°C. 1200 ml of water is then added and the organic material is extracted with 245 ml of toluene. After drying the toluene is distilled off and the residue is fractionated in vacuum. The yield of methyl-2-allyloxy-5-methylbenzoate, BP (10 mm Hg) = 152°–154°C, is 396 g (74%).

b. Methyl-3-allyl-5-methylsalicylate 396 g of methyl-2-allyloxy-5-methylbenzoate and 396 g of N-methyl-2-pyrrolidone are refluxed in a nitrogen atmosphere for 3 hours and then cooled to 40°C. Fractionation in vacuum yields 342 g (86%) of methyl-3-allyl-5-methylsalicylate, BP (11 mm Hg) = 142°–144°C.

c. 2,5-dimethyl-2,3-dihydrobenzo(b)furan-7-carboxylic acid

Dry hydrogen bromide (approximately 115 g) is bubbled slowly through a solution of 146 g of methyl-3-allyl-5-methylsalicylate and 0.1 g of anhydrous ferric chloride in 300 ml of chloroform at approximately 0°C. The solution is left standing over night and chloroform as well as excess hydrogen bromide is removed by vacuum stripping. The residue (182 g) is dissolved in 200 ml of methanol at 35°C and this solution is added slowly to a stirred solution of 100 g of potassium hydroxide in 400 ml of methanol while the temperature is maintained below 35°C by external cooling. Stirring at 25°C to 35°C is continued for additional 15 minutes after the addition and the mixture is then refluxed for 30 minutes. Methanol is now distilled off in vacuum and 150 ml of water is added to dissolve the salts. The solution is filtered and then acidified by addition of dilute hydrochloric acid. The crystals are filtered off and washed with water. After drying there is obtained 120 g (88%) of crude acid, M.P. 140°–145°C. Recrystallization from xylene yields the pure 2,5-dimethyl-2,3-dihydrobenzo(b)furan-7-carboxylic acid, M.P. 149°–150°C (90% recovery).

B. 2,5-dimethyl-2,3-dihydrobenzo(b)furan-7-carbonyl chloride, M.P. 41°–43°C, is prepared from 2,5-dimethyl-2,3-dihydrobenzo(b)furan-7-carboxylic acid and thionyl chloride as described in Example 1,B.

C. 4-(2-(2,5-dimethyl-2,3-dihydrobenzo(b)furan-7-carboxamido)-ethyl)-benzenesulfonamide, M.P. 199°–200°C (dimethylformamidemethanol) is prepared from 4-(2-aminoethyl)-benzenesulfonamide and 2,5-dimethyl-2,3-dihydrobenzo(b)furan-7-carbonyl chloride as described in Example 1,C.

D. N-(4-(2-(2,5-dimethyl-2,3-dihydrobenzo(b)furan-7-carboxamido)-ethyl)-benzenesulfonyl)-N'-cyclohexylurea, M.P. 207°–208°C, is prepared from cyclohexyl isocyanate and 4-(2-(2,5-dimethyl-2,3-dihydrobenzo(b)furan-7-carboxamido)-ethyl)-benzenesulfonamide as described in Example 1,D.

E. The sodium salt of N-(4-(2-(2,5-dimethyl-2,3-dihydrobenzo(b)furan-7-carboxamido)-ethyl)-benzenesulfonyl)-N'-cyclohexylurea, M.P. 244°–245°C, is prepared in a 94 percent yield by a process as described in Example 4 in which the solution of potassium hydroxide in methanol is replaced by a solution of sodium methylate in methanol.

EXAMPLE 6

N-(4-(2-(5-methylbenzo(b)furan-7-carboxamido)-ethyl)-benzenesulfonyl)-N'-cyclohexylurea A. 5-methylbenzo(b)furan-7-carboxylic acid a. 7-bromo-2-ethoxycarbonyl-5-methylbenzo(b)furan 195 g of 3-bromo-2-hydroxy-5-methylbenzaldehyde, 215 g of diethyl bromomalonate, 186 g of anhydrous potassium carbonate and 600ml of methyl isobutyl ketone are mixed and stirred at 100°C to 110°C for three hours. Most of the methyl isobutyl ketone is then distilled off in vacuum and the residue is cooled and then mixed with water. The crystals are filtered off and washed with water. AFter drying the yield of crude material, M.P. 78°–80°C, is 198 g (77%). Recrystallization from methanol yields 168 g (85% recovery) of pure 7-bromo-2-ethoxycarbonyl-5-methylbenzo(b)furan, M.P. 83°–84°C.

b. 7-bromo-5-methylbenzo(b)furan-2-carboxylic acid 168 g of 7-bromo-2-ethoxycarbonyl-5-methylbenzo(b)furan, 133 g of potassium hydroxide, 1400 ml water and 1400 ml methanol are stirred and refluxed for 30 minutes. 225 ml of concentrated hydrochloric acid is then added and the slurry is cooled to room temperature. The crystals are filtered off, washed with water and dried to yield 159 g (98%) of 7-bromo-5-methylbenzo(b)furan-2-carboxylic acid, M.P. 269°–271°C.

c. 7-bromo-5-methylbenzo(b)furan 4.8 g of copper powder and 148 g of 7-bromo-5-methylbenzo(b)furan-2-carboxylic acid are heated in 770 ml quinoline under nitrogen at 200°–220°C for 30 minutes and then cooled to room temperature. 800 ml of benzene is added and the copper is filtered off. The benzene solution is extracted three times with 1,500 ml 2 N hydrochloric acid each time. The benzene is then distilled off and the residue is distilled in vacuum to yield 118 g (97%) of 7-bromo-5-methylbenzo(b)furan, BP (10 mm Hg) = 117°–118°C.

d. 5-methylbenzo(b)furan-7-carboxylic acid 118 g of 7-bromo-5-methylbenzo(b)furan is added dropwise to 18 g of magnesium turnings in 560 ml of dry tetrahydrofuran with stirring and cooling to maintain the temperature below 30°C. The Grignard-solution is then forced into a vessel in which 200 ml tetrahydrofuran is stirred vigorously under carbon dioxide at a slight pressure while the temperature is held at 10°C to 15°C. A mixture of 62 ml of concentrated hydrochloric acid, 150 g of crushed ice and 600 ml of water is then added after which the tetrahydrofuran is removed by vacuum-stripping. The crystals are filtered off and washed with water after which the wet cake is redissolved in boiling glacial acetic acid. The solution is cooled to room temperature and the crystals are filtered off, washed with acetic acid and dried to yield 78 g (79%) of pure 5-methylbenzo(b)furan-7-carboxylic acid, M.P. 202°–203°C.

B. 5-methylbenzo(b)furan-7-carbonyl chloride is prepared from 5-methylbenzo(b)furan-7-carboxylic acid and thionyl chloride by the method described in Example 1,B.

C. 4-(2-(5-methylbenzo(b)furan-7-carboxamido)-ethyl)-benzenesulfonamide, M.P. 163°–164°C (dimethylformamide-methanol) is prepared from 5-methylbenzo(b)furan-7-carbonyl chloride and 4-(2-aminoethyl)-benzenesulfonamide by the method described in Example 1,C.

D. N-(4-(2-(5-methylbenzo(b)furan-7-carboxamido)-ethyl)-benzenesulfonyl)-N'-cyclohexylurea, M.P. 201°–202°C (dimethylformamidemethanol), is prepared from cyclohexyl isocyanate and 4-(2-(5-methylbenzo(b)furan-7-carboxamido)-ethyl)-benzenesulfonamide by the method described in Example 1,D.

The intermediates described hereafter are novel compounds useful in the preparation of novel sulfonylurea derivatives according to the invention.

The following compounds are prepared from the appropriate substituted salicylic ester and 2,3-dichloro-1-propene by the method described above in step A-a) of Example 1:

Methyl-2-β-chloroallyloxy-5-bromobenzoate, M.P. 51°–52°C (n-hexane),

Methyl-2-β-chloroallyloxy-5-chlorobenzoate, M.P. 40°–41°C (n-hexane), and

Methyl-2-β-chloroallyloxy-5-methylbenzoate, B.P. (0.2 mm Hg) = 119°–120°C.

The following compounds are prepared from the appropriate substituted salicylic ester and allyl bromide, crotyl bromide or β-methallyl chloride, respectively, by the method described above under step A-a) of Example 5 using acetone or dimethylformamide as the solvent:

Methyl-2-allyloxy-5-bromobenzoate, B.P. (0.4 mm Hg) = 103°–104°C, M.P. 31°–32°C (n-hexane), Methyl-2-allyloxy-5-chlorobenzoate, B.P. (3.5 mm Hg) = 140°–141°C, Methyl 2-allyloxy-4-chlorobenzoate, M.P. 59°–60°C (Methanol), Methyl-2-crotyloxy-5-methylbenzoate, B.P. (0.25 mm Hg) = 97°–98°C, Methyl-2-β-methallyloxy-5-methylbenzoate, B.P. (0.2 mm Hg) = 108°–110°C, and Methyl-2-β-methallyloxy-5-methoxybenzoate, B.P. (1 mm Hg) = 128°–129°C.

Rearrangement of these compounds as described in step A-b) of Example 1 or Example 5 yields the following intermediates:

Methyl-3-β-chloroallyl-5-methylsalicylate, B.P. (0.25 mm Hg) = 99°–102°C,

Methyl-3-β-chloroallyl-5-chlorosalicylate (used in the next step without purification), Methyl-3-β-chloroallyl-5-bromosalicylate (used in the next step without further purification), Methyl-3-allyl-5-bromosalicylate, B.P. (0.3 mm Hg) = 98°–99°C, Methyl-3-allyl-5-chlorosalicylate, B.P. (0.4 mm Hg) = 104°–105°C, Methyl-3-allyl-4-chlorosalicylate, B.P. (0.4 mm Hg) = 95°–98°C, Methyl-3-α-methallyl-5-methylsalicylate (from methyl-2-crotyloxy-5-methylbenzoate), B.P. (0.15 mm Hg) = 76°–78°C, Methyl-3-β-methallyl-5-methylsalicylate, B.P. (0.2 mm Hg) = 96°–97°C, and Methyl-3-β-methallyl-5-methoxysalicylate, B.P. (0.6 mm Hg) = 109°–110°C.

These intermediates are converted to the following novel carboxylic acids:

2,5-dimethylbenzo(b)furan-7-carboxylic acid, M.P. 168°–169°C (n-butyl acetate), 5-bromo-2-methylbenzo(b)furan-7-carboxylic acid, M.P. 230°–231°C (acetic acid), 5-chloro-2-methylbenzo(b)furan-7-carboxylic acid, M.P. 237°–238°C (n-butyl acetate), by the method described in step A,c of Example 1;

5-bromo-2-methyl-2,3-dihydrobenzo(b)furan-7-carboxylic acid, M.P. 208°–209°C (acetic acid), 5-chloro-2-methyl-2,3-dihydrobenzo(b)furan-7-carboxylic acid, M.P. 190°–191°C (acetic acid), 4-chloro-2-methyl-2,3-dihydrobenzo(b)furan-7-carboxylic acid, M.P. 212°–213°C (acetic acid), and 2,3,5-trimethyl-2,3-dihydrobenzo(b)furan-7-carboxylic acid, M.P. 140°–142°C (n-butyl acetate), by the method described in step A,c of Example 5.

2,2,5-trimethyl-2,3-dihydrobenzo(b)furan-7-carboxylic acid is prepared by the following method:

110 g of methyl-3-β-methallyl-5-methylsalicylate and 125 ml of 90% formic acid are stirred and refluxed for 2 hours. The formic acid is then distilled off at reduced pressure and the residue (111g) is stirred and refluxed for 1 hour with a solution of 100 g of sodium hydroxide in 500 ml of water. The mixture is then cooled and an excess of hydrochloric acid is added. The crystals are filtered off, washed with water and dried. The yield of crude acid is 96.4 g (93%). Recrystallization from n-butyl acetate yields 80.8 g (84% recovery) of pure 2,2,5-trimethyl-2,3-dihydrobenzo(b)furan-7-carboxylic acid, M.P. 169°–170°C.

In the same manner is prepared:

2,2-dimethyl-5-methoxy-2,3-dihydrobenzo(b)furan-7-carboxylic acid, M.P. 141°–142°C (n-butyl acetate).

5-methoxybenzo(b)furan-7-carboxylic acid, M.P. 172°–173°C (acetic acid)

is prepared by the method described in step A of Example 6, using 3-bromo-5-methoxysalicylic aldehyde as starting material.

5-methoxy-2,3-dihydrobenzo(b)furan-7-carboxylic acid, M.P. 133°–135°C is prepared by the hydrogenation of 5-methoxybenzo(b)furan-7-carboxylic acid by the method used in step A,d of Example 1.

5-bromo-2,3-dihydrobenzo(b)furan-7-carboxylic acid, M.P. 225°–227°C (dioxane)

is prepared by bromination of 2,3-dihydrobenzo(b)furan-7-carboxylic acid in glacial acetic acid at 25°–30°C.

5-chloro-2,3-dihydrobenzo(b)furan-7-carboxylic acid, M.P. 218°–220°C (dioxane)

is prepared by chlorination of 2,3-dihydrobenzo(b)furan-7-carboxylic acid in glacial acetic acid at 25°–30°C in the presence of a small amount of iron.

The following sulfonamides are prepared from the appropriate carboxylic acids by the methods described in Example 1, step B and Step C. The compounds have been recrystallized from dimethylformamide methanol unless otherwise stated:

4-(2-(2,5-dimethylbenzo(b)furan-7-carboxamido)-ethyl)-benzenesulfonamide, M.P. 194°–195°C (methanol), 4-(2-(5-chloro-2-methylbenzo(b)furan-7-carboxamido)-ethyl)-benzenesulfonamide, M.P. 215°–216°C, 4-(2-(5-bromo-2-methyl-2,3-dihydrobenzo(b)furan-7-carboxamido)-ethyl)-benzenesulfonamide, M.P. 252°–253°C, 4-(2-(5-chloro-2-methyl-2,3-dihydrobenzo(b)furan-7-carboxamido)-ethyl)-benzenesulfonamide, M.P. 245°–244°C, 4-(2-(4-chloro-2-methyl-2,3-dihydrobenzo(b)furan-7-carboxamido)-ethyl)-benzenesulfonamide, M.P. 208°–209°C, 4-(2-(2,3,5-trimethyl-2,3-dihydrobenzo(b)furan-7-carboxamido)-ethyl)-benzenesulfonamide, M.P. 199°–200°C, 4-(2-(2,2,5-trimethyl-2,3-dihydrobenzo(b)furan-7-carboxamido)-ethyl)-benzenesulfonamide, M.P. 185°–186°C, (methanol), 4-(2-(2,2-dimethyl-5-methoxy-2,3-dihydrobenzo(b)furan-7-carboxamido)-ethyl)-benzenesulfonamide, M.P. 175°–176°C (methanol), 4-(2-(5-methoxybenzo(b)furan-7-carboxamido)-ethyl)-benzenesulfonamide, M.P. 197°–198°C, 4-(2-(5-methoxy-2-methylbenzo(b)furan-7-carboxamido)-ethyl)-benzenesulfonamide, M.P. 206°–207°C, 4-(4-(4-methoxy-2-methyl-2,3-dihydrobenzo(b)furan-7-carboxamido)-ethyl)-benzenesulfonamide, M.P. 225°–226°C, 4-(2-(2-methyl-2,3-dihydrobenzo(b)furan-7-carboxamido)-ethyl)-benzenesulfonamide, M.P. 176°–177°C, 4-(2-(2-methylbenzo(b)furan-7-carboxamido)-ethyl)-benzenesulfonamide, M.P. 184°–186°C (acetone-water), 4-(2-(5-methyl-2,3-dihydrobenzo(b)furan-7-carboxamido)-ethyl)-benzenesulfonamide, M.P. 185°–186°C, 4-(2-(5-bromo-2,3-dihydrobenzo(b)furan-7-carboxamido)-ethyl)-benzenesulfonamide, M.P. 205°–206°C, and 4-(2-(5-chloro-2,3-dihydrobenzo(b)furan-7-carboxamido)-ethyl)-benzenesulfonamide, M.P. 224°–226°C.

The following novel N-arylsulfonylcarbamates are prepared from the potassium salts of the correspondingly substituted sulfonamides from above and ethyl chloroformate by the method of Marshall (J. Org. Chem. 23, 927 (1958)):

Ethyl-N-(4-(2-(2,5-dimethyl-2,3-dihydrobenzo(b)furan-7-carboxamido)-ethyl)-benzenesulfonyl)-carbamate, M.P. 199°–201°C (Dioxane-Water), and Ethyl-N-(4-(2-(5-methoxy-2-methyl-2,3-dihydrobenzo(b)furan-7-carboxamido)-ethyl)-benzenesulfonyl)-carbamate M.P. 171°–173°C (Dioxane-Water).

EXAMPLE 7

N-(4-(2-(4-methoxy-2-methyl-2,3-dihydrobenzo(b)furan-7-carboxamido)-ethyl)-benzenesulfonyl)-N'-(4-methylcyclohexyl)-urea 3.9 g of 4-(2-(4-methoxy-2-methyl-2,3-dihydrobenzo(b)furan-7-carboxamido)-ethyl)-benzenesulfonamide, 3.1 g of anhydrous potassium carbonate, 1.7 g of 4-methylcyclohexyl isocyanate and 50 ml of acetone are stirred and refluxed for sixteen hours. An almost clear solution is formed since only excess potassium carbonate remains undissolved. The solution is cooled and then filtered. Acetone is distilled off in vacuum from the filtrate and the residue (4.9 g) is dissolved in 150 ml of water. The solution is heated to 60°C for one hour and then left standing over night. The pH is adjusted to 9.2 and the insoluble N,N'-di-(4-methylcyclohexyl)-urea formed from excess isocyanate is then filtered off. Dilute hydrochloric acid is added to the filtrate and the precipitate is filtered off, washed with water and dried. The yield of crude material, M.P. 193°–195°C, is 3.5 g (66%). Recrystallization from dimethylformamide-methanol yields pure N-(4-(2-(4-methoxy-2-methyl-2,3-dihydrobenzo(b)furan-7-carboxamido)-ethyl)-benzenesulfonyl)-N'-(4-methylcyclohexyl)-urea, M.P. 199°–201°C.

The following sulfonyl urea derivatives are prepared as described above in Example 1,D or in Example 7 from the appropriate sulfonamides and isocyanates as listed below:

| EX. NO. | SULFONYLUREA DERIVATIVE (NAME AND M.P.) | STARTING MATERIALS | |
|---|---|---|---|
| | | SULFONAMIDE | ISOCYANATE |
| 8 | N-(4-(2-(2,3-dihydrobenzo(b)furan-7-carboxamido)-ethyl)-benzenesulfonyl)-N'-(trans-4-methylcyclohexyl)-urea, M.P. 201–202°C (Dioxane-Water) | 4-(2-(2,3-dihydrobenzo(b)furan-7-carboxamido)-ethyl)-benzenesulfonamide | trans-4-methyl-cyclohexyl-isocyanate |
| 9 | N-(4-(2-(2,5-dimethyl-2,3-dihydrobenzo(b)furan-7-carboxamido)-ethyl)-benzenesulfonyl)-N'-(4-methylcyclohexyl)-urea, M.P. 183–185°C (dimethylformamide-methanol) | 4-(2-(2,5-dimethyl-2,3-dihydrobenzo(b)furan-7-carboxamido)-ethyl)-benzenesulfonamide | 4-methylcyclohexyl isocyanate |
| 10 | N-(4-(2-(2,5-dimethyl-2,3-dihydrobenzo(b)furan-7-carboxamido)-ethyl)-benzenesulfonyl)-N'-n-butylurea, M.P. 148–149°C (methanol) | -do- | n-butyl isocyanate |
| 11 | N-(4-(2-(2,5-dimethyl-2,3-dihydrobenzo(b)furan-7-carboxamido)-ethyl)-benzenesulfonyl)-N'-cyclopentylurea, M.P. 174°C (methanol-water) | -do- | cyclopentyl isocyanate |
| 12 | N-(4-(2-(5-methylbenzo(b)furan-7-carboxamido)-ethyl)-benzenesulfonyl)-N'-(4-trans-methylcyclohexyl)-urea, M.P. 174–175°C (Dioxane-Water) | 4-(2-(5-methylbenzo(b)furan-7-carboxamido)-ethyl)-benzenesulfonamide | trans-4-methyl-cyclohexyl isocyanate |
| 13 | N-(4-(2-(4-methoxy-2-methyl-2,3-dihydrobenzo(b)furan-7-carboxamido)-ethyl)-benzenesulfonyl)-N'-cyclohexylurea, M.P. 175–176°C (methanol) | 4-(2-(4-methoxy-2-methyl-2,3-dihydrobenzo(b)furan-7-carboxamido)-ethyl)-benzenesulfonamide | cyclohexyl isocyanate |
| 14 | N-(4-(2-(5-chloro-2-methylbenzo(b)furan-7-carboxamido)-ethyl)-benzenesulfonyl)-N'-cyclohexylurea, M.P. 193–194°C (dimethylformamide-methanol) | 4-(2-(5-chloro-2-methylbenzo(b)furan-7-carboxamido)-ethyl)-benzenesulfonamide | -do- |
| 15 | N-(4-(2-(2,5-dimethylbenzo(b)furan-7-carboxamido)-ethyl)-benzenesulfonyl)-N'-cyclohexylurea, M.P. 188–190 (dimethylformamide-methanol) | 4-(2-(2,5-dimethylbenzo(b)furan-7-carboxamido)-ethyl)-benzenesulfonamide | cyclohexyl isocyanate |
| 16 | N-(4-(2-(2,5-dimethylbenzo(b)furan-7-carboxamido)-ethyl)-benzenesulfonyl)-N'-(trans-4-methylcyclohexyl)-urea, M.P. 198–199°C (Dioxane-Water) | -do- | trans-4-methyl-cyclohexyl isocyanate |
| 17 | N-(4-(2-(5-bromo-2-methyl-2,3-dihydrobenzo(b)furan-7-carboxamido)-ethyl)-benzenesulfonyl)-N'-cyclohexylurea, M.P. 177–178°C (dimethylformamide-methanol) | 4-(2-(5-bromo-2-methyl-2,3-dihydrobenzo(b)furan-7-carboxamido)-ethyl)-benzenesulfonamide | cyclohexyl isocyanate |
| 18 | N-(4-(2-(5-chloro-2-methyl-2,3-dihydrobenzo(b)furan-7-carboxamido)-ethyl)-benzenesulfonyl)-N'-cyclohexylurea, M.P. 184–186°C (dimethylformamide-methanol) | 4-(2-(5-chloro-2-methyl-2,3-dihydrobenzo(b)furan-7-carboxamido)-ethyl)-benzenesulfonamide | -do- |
| 19 | N-(4-(2-(5-chloro-2-methyl-2,3-dihydrobenzo(b)furan-7-carboxamido)-ethyl)-benzenesulfonyl)-N'-n-butylurea, M.P. 173–174°C (dimethylformamide-methanol) | -do- | n-butyl isocyanate |
| 20 | N-(4-(2-(5-chloro-2-methyl-2,3-dihydrobenzo(b)furan-7-carboxamido)-ethyl)-benzenesulfonyl)-N'-(4,4-dimethylcyclohexyl)-urea, M.P. 132–135°C (methanol) | -do- | 4,4-dimethylcyclohexyl isocyanate |
| 21 | N-(4-(2-(5-chloro-2-methyl-2,3-dihydrobenzo(b)furan-7-carboxamido)-ethyl)-benzenesulfonyl)-N'-(4-methylcyclohexyl)-urea, M.P. 113–115°C (n-butyl acetate) | -do- | 4-methylcyclohexyl isocyanate |
| 22 | N-(4-(2-(5-methoxy-2-methyl-2,3-dihydrobenzo(b)furan-7-carboxamido-ethyl)-benzenesulfonyl)-N'-(4,4-dimethylcyclohexyl)-urea, M.P. 141–143°C (methanol) | 4-(2-(5-methoxy-2-methyl-2,3-dihydrobenzo(b)furan-7-carboxamido)-ethyl)-benzenesulfonamide | 4,4-dimethylcyclohexyl isocyanate |
| 23 | N-(4-(2-(5-chloro-2-methyl-2,3-dihydrobenzo(b)furan-7-carboxamido)-ethyl)-benzenesulfonyl)-N'-(2-cyclohexenyl)-urea, M.P. 170–172°C (Acetone-Water) | 4-(2-(5-chloro-2-methyl-2,3-dihydrobenzo(b)furan-7-carboxamido)-ethyl)-benzenesulfonamide | 2-cyclohexenyl isocyanate |
| 24 | N-(4-(2-(4-chloro-2-methyl-2,3-dihydrobenzo(b)furan-7-carboxamido)-ethyl)-benzenesulfonyl-N'-cyclohexylurea, M.P. 180–181°C (dimethylformamide-methanol) | 4-(2-(4-chloro-2-methyl-2,3-dihydrobenzo(b)furan-7-carboxamido)-ethyl)-benzenesulfonamide | cyclohexyl isocyanate |

| EX. NO. | SULFONYLUREA DERIVATIVE (NAME AND M.P.) | STARTING MATERIALS | |
|---|---|---|---|
| | | SULFONAMIDE | ISOCYANATE |
| 25 | N-(4-(2-(2,3,5-trimethyl-2,3-dihydrobenzo(b)furan-7-carboxamido)-ethyl)-benzenesulfonyl)-N'-cyclohexylurea, M.P. 210–211°C (dimethylformamide-methanol) | 4-(2-(2,3,5-trimethyl-2,3-dihydrobenzo(b)furan-7-carboxamido)-ethyl)-benzenesulfonamide | -do- |
| 26 | N-(4-(2-(2,2,5-trimethyl-2,3-dihydrobenzo(b)furan-7-carboxamido)-ethyl)-benzenesulfonyl)-N'-cyclohexylurea, M.P. 170–171°C (dimethylformamide-methanol) | 4-(2-(2,2,5-trimethyl-2,3-dihydrobenzo(b)furan-7-carboxamido)-ethyl)-benzenesulfonamide | -do- |
| 27 | N-(4-(2-(2-methylbenzo(b)furan-7-carboxamido)-ethyl)-benzenesulfonyl)-N'-cyclohexylurea, M.P. 182–184°C (tetrahydrofuran-acetone) | 4-(2-(2-methylbenzo(b)furan-7-carboxamide)-ethyl)-benzenesulfonamide | -do- |
| 28 | N-(4-(2-(2-methylbenzo(b)furan-7-carboxamido)-ethyl)-benzenesulfonyl)-N'-(4-methylcyclohexyl)-urea, M.P. 175–177°C (dimethylformamide methanol) | -do- | 4-methylcyclohexyl isocyanate |

EXAMPLE 36

N-(4-(2-(2,5-dimethyl-2,3-dihydrobenzo(b)furan-7-carboxamido)-ethyl)-benzenesulfonyl)-N'-(4-methoxycyclohexyl)-urea.

1.82 g of 4-methoxycyclohexylamine hydrochloride, 4.5 g of ethyl-N-(4-(2-(2,5-dimethyl-2,3-dihydrobenzo(b)furan-7-carboxamido)-ethyl)-benzenesulfonyl)-carbamate, 1.32 g of triethylamine and 25 ml of dioxane are mixed and stirred at 75°C for ninety minutes. The temperature is then raised to 110°C and maintained at this level for additional thirty minutes after which the reaction mixture is cooled and poured into ice and water containing a small amount of hydrochloric acid. The precipitate is filtered off, washed with water and dried. The yield of crude material is 5.0 g (95%). Recrystallization from methanol-water yields pure N-(4-(2-(2,5-dimethyl-2,3-dihydrobenzo(b)furan-7-carboxamido)-ethyl)-benzenesulfonyl-N'-(4-methoxycyclohexyl)-urea, M.P. 166°–168°C.

EXAMPLE 37

N-(4-(2-(5-methoxy-2-methyl-2,3-dihydrobenzo(b)furan-7-carboxamido)-ethyl)-benzenesulfonyl)-N'-(4-methoxycyclohexyl)-urea Using 4.6 g of ethyl-N-(4-(2-(5-methoxy-2-methyl-2,3-dihydrobenzo(b)furan-7-carboxamido)-ethyl)-benzenesulfonyl)-carbanate and 1.82 g of 4-methoxycyclohexylamine hydrochloride in a process as described in Example 36, there is obtained N-(4-(2-(5-methoxy-2-methyl-2,3-dihydrobenzo(b)furan-7-carboxamido)-ethyl)-benzenesulfonyl)-N'-(4-methoxycyclohexyl)-urea, M.P. 170°–172°C (methanol-water).

| EX. No. | SULFONYLUREA DERIVATIVE (NAME AND M.P.) | STARTING MATERIALS | |
|---|---|---|---|
| | | SULFONAMIDE | ISOCYANATE |
| 29 | N-(4-(2-(2-methyl-2,3-dihydrobenzo(b)furan-7-carboxamido)-ethyl)-benzenesulfonyl)-N'-n-butylurea, M.P. 125–126°C (acetone-water) | 4-(2-(2-methyl-2,3-dihydrobenzo(b)furan-7-carboxamido)-ethyl)-benzenesulfonamide | n-butyl isocyanate |
| 30 | N-(4-(2-(2-methyl-2,3-dihydrobenzo(b)furan-7-carboxamido)-ethyl)-benzenesulfonyl)-N'-cyclohexylurea, M.P. 180–181°C (dimethylformamide-methanol) | -do- | cyclohexyl isocyanate |
| 31 | N-(4-(2-(2-methyl-2,3-dihydrobenzo(b)furan-7-carboxamido)-ethyl)-benzenesulfonyl)-N'-(4-methylcyclohexyl)-urea, M.P. 159–160°C (methanol) | -do- | 4-methylcyclohexyl isocyanate |
| 32 | N-(4-(2-(5-methyl-2,3-dihydrobenzo(b)furan-7-carboxamido)-ethyl)-benzenesulfonyl)-N'-cyclohexylurea, M.P.203–204°C (dimethylformamide-methanol) | 4-(2-(5-methyl-2,3-dihydrobenzo(b)furan-7-carboxamido-ethyl)-benzenesulfonamide | cyclohexyl isocyanate |
| 33 | N-(4-(2-(5-methyl-2,3-dihydrobenzo(b)furan-7-carboxamido)-ethyl)-benzenesulfonyl)-N'-(trans-4-methylcyclohexyl)-urea, M.P. 159–160°C (Dioxane-Water) | -do- | trans-4-methylcyclohexyl isocyanate |
| 34 | N-(4-(2-(5-bromo-2,3-dihydrobenzo(b)furan-7-carboxamido)-ethyl)-benzenesulfonyl)-N'-cyclohexylurea, M.P. 202–203°C (precipitated in water) | 4-(2-(5-bromo-2,3-dihydrobenzo(b)furan-7-carboxamido)-ethyl)-benzenesulfonamide | cyclohexyl isocyanate |
| 35 | N-(4-(2-(5-chloro-2,3-dihydrobenzo(b)furan-7-carboxamido)-ethyl)-benzenesulfonyl)-N'-cyclohexylurea, M.P. 154–155°C (precipitated in water) | 4-(2-(5-chloro-2,3-dihydrobenzo(b)furan-7-carboxamido)-ethyl)-benzenesulfonamide | -do- |

EXAMPLE 38

N-(4-(2-(2,5-dimethyl-2,3-dihydrobenzo(b)furan-7-carboxamido)-ethyl)-benzenesulfonyl)-N'-(2,5-endomethylene-cyclohexyl)-urea Proceeding as in Example 36 but using 1.62 g of 2,5-endomethylene-cyclohexylamine hydrochloride (instead of the 4-methoxycyclohexylamine hydrochloride) there is obtained N-(4-(2-(2,5-dimethyl-2,3-dihydrobenzo(b)furan-7-carboxamido)-ethyl)-benzenesulfonyl)-N'-(2,5-endomethylene-cyclohexyl)-urea, M.P. 199°–200°C (methanol-water).

EXAMPLE 39

N-(4-(2-(5-methoxy-2-methyl-2,3-dihydrobenzo(b)furan-7-carboxamido)-ethyl)-benzenesulfonyl)-N'-(2-cyclohexenyl)-urea Proceeding as in Example 37 except using 1.2 g of 2-cyclohexenylamine (instead of the 1.82 g of 4-methoxycyclohexylamine hydrochloride) there is obtained 3.8 g (74%) of purified N-(4-(2-(5-methoxy-2-methyl-2,3-dihydrobenzo(b)furan-7-carboxamido)-ethyl)-benzenesulfonyl)-N'-(2-cyclohexenyl)-urea, M.P. 160°–161°C (methanol-water).

EXAMPLE 40

N-(4-(2-(2,5-dimethyl-2,3-dihydrobenzo(b)furan-7-carboxamido)-ethyl)-benzenesulfonyl)-N'-(2-cyclohexenyl)-urea Proceeding as in Example 36 except using 1,2 g of 2-cyclohexenylamine (instead of the 1.82 g of 4-methoxycyclohexylamine hydrochloride) there is obtained 2.5 g (63%) of purified N-(4-(2-(2,5-dimethyl-2,3-dihydrobenzo(b)furan-7-carboxamido)-ethyl)-benzenesulfonyl)-N'-(2-cyclohexenyl)-urea, M.P. 176°–177°C (methanol-water).

EXAMPLE 41

N-(4-(2-(2,5-dimethyl-2,3-dihydrobenzo(b)furan-7-carboxamido)-ethyl)-benzenesulfonyl)-N'-(1,4-endoethylene-cyclohexyl)-urea A solution of 5.2 g of 4-(2-(2,5-dimethyl-2,3-dihydrobenzo(b)furan-7-carboxamido)-ethyl)-benzenesulfonamide in 20 ml of dimethylformamide is added slowly to a suspension of 0.4 g of sodium hydride in 20 ml of dimethylformamide at 40°–60°C. Stirring is continued until the evolution of hydrogen ceases. The mixture is then cooled to 0°C and 2.8 g of N,N'-carbonyldiimidazole is added. A solution of 3.5 g of 1-aminobicyclo[2.2.2]octane hydrobromide (M.P. 345°C) is now added dropwise at 0°C to 5°C after which the reaction mixture is stirred at 85°–95°C for 2 hours and finally cooled. Most of the dimethylformamide is stripped off in vacuum and the residue (14.8 g) is dissolved in 170 ml of 0.1 N sodium hydroxide solution. A small amount of insoluble material is removed by filtration and the filtrate is extracted with ether (3 × 50 ml) and finally stripped in vacuum for a short period of time. The alkaline solution is then added to an excess of dilute hydrochloric acid and the precipitate is filtered off and washed thoroughly with water. The wet cake is redissolved in a mixture of 1 % ammonia solution (30 ml) and acetone (15 ml). A small amount of insoluble material is removed by filtration and the filtrate is added to an excess of dilute hydrochloric acid. The crystals are filtered off, washed with water and dried. The yield of crude material is 4.2 g (57%), M.P. 181°–183°C. Recrystallization from dimethylformamide-methanol yields 30 g (71% recovery) of pure N-(4-(2-(2,5-dimethyl-2,3-dihydrobenzo(b)furan-7-carboxamido)-ethyl)-benzenesulfonyl)-N'-(1,4-endoethylene-cyclohexyl)-urea, M.P. 188°–189°C.

The sodium salt of this compound, M.P. 236°–238°C, is prepared through treatment with sodium hydroxide in aqueous acetone.

EXAMPLE 42

N-(4-(2-(2,2,5-trimethyl-2,3-dihydrobenzo(b)furan-7-carboxamido)-ethyl-benzenesulfonyl)-N'-cycloheptylurea 3.9 g of 4-(2-(2,2,5-trimethyl)-2,3-dihydrobenzo(b)furan-7-carboxamido)-ethyl)-benzenesulfonamide is dissolved in 45 ml of dimethylformamide and the solution is then added at 50°C to a stirred suspension of 0.3 g of sodium hydride in 15 ml of dimethylformamide. The mixture is then stirred at 100°C until the evolution of hydrogen ceases. A solution of 3.1 g of N'-cycloheptyl-N,N-diphenylurea (M.P. 145°–146°C, prepared from cycloheptylamine and diphenylcarbamoyl chloride in dioxane in the presence of excess triethylamine) in 25 ml of dimethylformamide is now added and stirring at 100°C is continued for one hour. The dimethylformamide is then stripped off in vacuum and the residu is dissolved in a mixture of 2 ml of 4 N sodium hydroxide solution, 250 ml of water and 300 ml of acetone. Diphenylamine is removed by extraction with ether and the pH is then adjusted to 9.1. A small amount of insoluble material is removed by filtration and the filtrate is added to excess dilute hydrochloric acid. The crystals are filtered off, washed with water and dried.

The yield of crude material, M.P. 164°–167°C, is 4.1 g (77%). Recrystallization from methanol yields 2.6 g (61% recovery) of pure N-(4-(2-(2,2,5-trimethyl-2,3-dihydrobenzo(b)furan-7-carboxamido)-ethyl)-benzenesulfonyl)-N'-cycloheptylurea, M.P. 171°–172°C.

EXAMPLE 43

N-(4-(2-(2,5-dimethyl-2,3-dihydrobenzo(b)furan-7-carboxamido)-ethyl)-benzenesulfonyl)-N'-cycloheptylurea From 4-(2-(2,5-dimethyl-2,3-dihydrobenzo(b)furan-7-carboxamido-ethyl)-benzenesulfonamide when processed and worked up as described in Example 42 there is obtained N-(4-(2-(2,5-dimethyl-2,3-dihydrobenzo(b)furan-7-carboxamido)-ethyl)-benzenesulfonyl)-N'-cycloheptylurea, M.P. 208°–210°C (dimethylformamide-water)

EXAMPLE 44

N-(4-(2-(5-methoxy-2-methyl-2,3-dihydrobenzo(b)furan-7carboxamido)-ethyl)-benzenesulfonyl)-N'-cycloheptylurea From 4-(2-(5-methoxy-2-methyl-2,3-dihydrobenzo(b)furan-7-carboxamido)-ethyl)- benzenesulfonamide when processed and worked up as described in Example 42, there is obtained N-(4-(2-(5-methoxy-2-methyl-2,3-dihydrobenzo(b)furan-7-carboxamido)-ethyl)-benzenesulfonyl)-N'-cycloheptylurea, M.P. 134°–136°C (methanol-water).

Example 45

Sodium salt of N-(4-(2-(5-methoxy-2-methyl-2,3-dihydrobenzo(b)furan-7-carboxamido)-ethyl-(benzenesulfonyl)-N'-cyclohexylurea 5.2 g of N-(4-(2-(5-methoxy-2-methyl-2,3-dihydrobenzo(b)furan-7-carboxamido)-ethyl)-benzenesulfonyl)-N'-cyclohexylurea is dissolved in a solution of 0.54 g of sodium methylate in 35 ml methanol. 425 ml of diethyl ether is slowly added and the mixture is stirred until crystallization is completed. The crystals are filtered off and are washed with diethyl ether and then dried in vacuum. The yield of sodium salt, M.P. 249°–251°C, is 5.0 g (92%).

EXAMPLE 46

Potassium salt of N-(4-(2-(5-methoxy-2-methyl-2,3-dihydrobenzo(b)furan-7-carboxamido)-ethyl)-benzenesulfony)-N'-cyclohexylurea N-(4-(2-(5-methoxy-2-methyl-2,3-dihydrobenzo(b)furan-7-carboxamido)-ethyl)-benzenesulfonyl)-N'cyclohexylurea is converted to its potassium salt, M.P. 232°–233°C, by the method described in Example 4. The yield is 92%.

EXAMPLE 47

Potassium salt of N-(4-(2-(5-methoxy-2-methyl-2,3-dihydrobenzo(b)furan-7-carboxamido)-ethyl)-benzenesulfonyl)-N'-(trans-4-methylcyclohexyl)-urea N-(4(2-(5-methoxy-2-methyl-2,3-dihydrobenzo(b)furan-7-carboxamido)-ethyl)-benzenesulfonyl)-N'-(trans-4-methylcyclohexyl)-urea is converted to its potassium salt, M.P. 170°–172°C, in an 84% yield by the method described in Example 4.

EXAMPLE 48

Sodium salt of N-(4-(2-(2,3-dihydrobenzo(b)furan-7-carboxamido)-ethyl)-benzenesulfonyl)-N'-cyclohexylurea N-(4-(2-(2,3-dihydrobenzo(b)furan-7-carboxamido)-ethyl)-benzenesulfonyl)-N'-cyclohexylurea is converted to its sodium salt, M.P. 237°–238°C, in a 94% yield by the method described in Example 45.

What we claim is:
1. A compound of the formula:

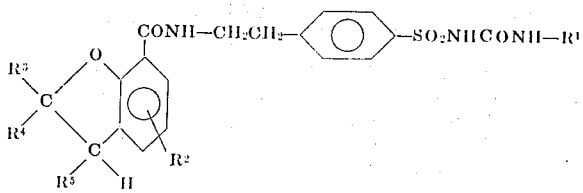

in which $R^1$ is n-butyl, cycloalkyl having five to eight ring carbon atoms, cyclohexenyl, 4-methylcyclohexyl, 4,4-dimethylcyclohexyl, 4-methoxycyclohexyl, 2,5-endomethylenecyclohexyl or 1,4-endoethylenecyclohexyl, $R^2$ is hydrogen or methoxy, methyl, bromine or chlorine in position four or in position five, $R^3$ represents methyl or hydrogen, $R^4$ and $R^5$ are each hydrogen or methyl but not both methyl at the same time, or $R^4$ and $R^5$ may together represent the additional bond between the 2 and 3 position carbons of a benzo(b)furan ring, and its pharmaceutically acceptable alkali metal salts.

2. A compound of the formula:

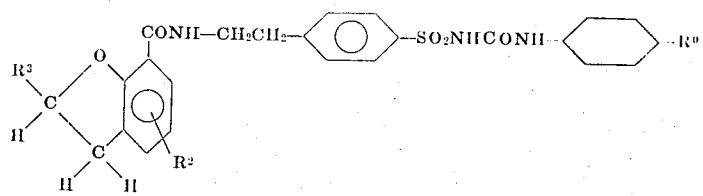

in which $R^a$ is hydrogen or methyl, $R^2$ is hydrogen, chlorine, bromine, methyl or methoxy, and $R^3$ is hydrogen or methyl, and its pharmaceutically acceptable alkali metal salts.

3. The sodium salt of a compound according to claim 2.

4. The potassium salt of a compound according to claim 2.

5. A compound according to claim 2, in which the compound is N-(4-(2-(2,3-dihydrobenzo(b)furan-7-carboxamido)-ethyl)-benzenesulfonyl)-N'-cyclohexylurea.

6. A compound according to claim 2, in which the compound is N-(4-(2-(5-methoxy-2-methyl-2,3-dihydrobenzo(b)furan-7-carboxamido)-ethyl)-benzenesulfonyl-N'-cyclohexylurea.

7. A compound according to claim 2, in which the compound is N-(4-(2-(5-methoxy-2-methyl-2,3-dihydrobenzo(b)furan-7-carboxamido)-ethyl)-benzenesulfonyl)-N'-(trans-4-methylcyclohexyl)-urea.

8. A compound according to claim 2, in which the compound is N-(4-(2-(2,5-dimethyl-2,3-dihydrobenzo(b)furan-7-carboxamido)-ethyl)-benzenesulfonyl)-N'-cyclohexylurea.

9. A compound according to claim 2, in which the compound is N-(4-(2-(5-methyl-2,3-dihydrobenzo(b)furan-7-carboxamido)-ethyl)-benzenesulfonyl)-N'-cyclohexylurea.

10. A compound according to claim 2, in which the compound is N-(4-(2-(5-methyl-2,3-dihydrobenzo(b)furan-7-carboxamido)-ethyl)-benzenesulfonyl)-N'-(trans-4-methylcyclohexyl)-urea.

11. A compound according to claim 2, in which the compound is N-(4-(2-(5-bromo-2-methyl-2,3-dihydrobenzo(b)furan-7-carboxamido)-ethyl)-benzenesulfonyl-N'-cyclohexylurea.

12. A compound according to claim 2, in which the compound is N-(4-(2-(5-bromo-2,3-dihydrobenzo(b)furan-7-carboxamido)-ethyl)-benzenesulfonyl)-N'-cyclohexylurea.

13. A compound according to claim 2, in which the compound is N-(4-(2-(5-chloro-2-methyl-2,3-dihydrobenzo(b)furan-7-carboxamido)-ethyl)-benzenesulfonyl)-N'-cyclohexylurea.

14. A compound according to claim 2, in which the compound is N-(4-(2-(5-chloro-2,3-dihydrobenzo(b)furan-7-carboxamido)-ethyl)-benzenesulfonyl)-N'-cyclohexylurea.

* * * * *

UNITED STATES PATENT OFFICE
CERTIFICATE OF CORRECTION

PATENT NO. : 3,860,619
DATED : January 14, 1975
INVENTOR(S) : Haldor Christensen, Behrend Friedrich Lundt, Frederik Christian Grønvald, William Andersen It is certified that error appears in the above-identified patent and that said Letters Patent are hereby corrected as shown below:

PAGE TWO

Column 26, Example 42, line 16, "-ethyl-" should read -- -ethyl)- --

Column 26, line 32, "residu" should read --residue--

Column 26, Example 43, line 54, "carboxamido-ethyl" should read --carboxamido)-ethyl--

Column 27, Example 45, line 11, "-ethyl-" should read -- -ethyl)- --

Column 27, line 52, "N-(4(2-" should read --N-(4-(2- --

Signed and Sealed this fourteenth Day of October 1975

[SEAL]

Attest:

RUTH C. MASON
Attesting Officer

C. MARSHALL DANN
Commissioner of Patents and Trademarks